US010455121B2

(12) United States Patent
Thumpudi (10) Patent No.: US 10,455,121 B2
(45) Date of Patent: Oct. 22, 2019

(54) REPRESENTING ADVANCED COLOR IMAGES IN LEGACY CONTAINERS (71) Applicant: Microsoft Technology Licensing, LLC, Redmond, WA (US)

(72) Inventor: Naveen Thumpudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/700,542

(22) Filed: Sep. 11, 2017

(65) Prior Publication Data

US 2018/0332192 A1 Nov. 15, 2018

Related U.S. Application Data (60) Provisional application No. 62/505,635, filed on May 12, 2017.

(51) Int. Cl.
*G06K 9/00* (2006.01)
*H04N 1/60* (2006.01)
*H04N 19/174* (2014.01)
*H04N 19/184* (2014.01)
*H04N 1/64* (2006.01)
*H04N 19/60* (2014.01)
(Continued)

(52) U.S. Cl.
CPC ............ *H04N 1/6008* (2013.01); *H04N 1/64* (2013.01); *H04N 19/174* (2014.11); *H04N 19/184* (2014.11); *H04N 19/60* (2014.11); *H04N 19/186* (2014.11); *H04N 19/625* (2014.11); *H04N 2201/0084* (2013.01)

(58) Field of Classification Search
CPC ...... H04N 1/64; H04N 19/184; H04N 19/174; H04N 1/6008
USPC ........................................................ 382/166
See application file for complete search history.

(56) References Cited

U.S. PATENT DOCUMENTS 6,282,312 B1 * 8/2001 McCarthy ............. G06T 11/001
358/523
8,212,893 B2 7/2012 Bodnar et al.
(Continued)

FOREIGN PATENT DOCUMENTS

CN 102404578 A 4/2012
EP 0991020 A2 4/2000
EP 1227661 A2 7/2002

OTHER PUBLICATIONS

"International Search Report and Written Opinion Issued in PCT Application No. PCT/US18/028771", dated Jul. 2, 2018, 11 Pages.
(Continued)

*Primary Examiner* — Van D Huynh
(74) *Attorney, Agent, or Firm* — Arent Fox LLP (57) ABSTRACT Described are examples for storing advanced color images using legacy containers. An advanced color image can be obtained in a first image format comprising a number of parameters at a first bit depth per pixel. Values of the number of parameters of the advanced color image can be encoded into second values of one or more legacy containers, where each of the one or more legacy containers are of a second image format including the same number of parameters at a second bit depth per pixel. The advanced color image can be stored and/or communicated as the one or more legacy containers.

20 Claims, 4 Drawing Sheets (51) Int. Cl.
  *H04N 19/186* (2014.01)
  *H04N 19/625* (2014.01)

(56) References Cited

U.S. PATENT DOCUMENTS

| | | | |
|---|---|---|---|
| 9,143,672 B2 | 9/2015 | Creamer et al. | |
| 9,516,221 B2 | 12/2016 | Lee | |
| 9,516,234 B2 | 12/2016 | Baek et al. | |
| 2001/0033286 A1* | 10/2001 | Stokes | H04N 1/64 345/590 |
| 2002/0130957 A1* | 9/2002 | Gallagher | H04N 1/64 348/222.1 |
| 2009/0257096 A1 | 10/2009 | Hsu | |
| 2010/0260429 A1* | 10/2010 | Ichinose | H04N 19/176 382/232 |
| 2011/0316973 A1* | 12/2011 | Miller | G09G 3/003 348/43 |
| 2012/0224774 A1* | 9/2012 | Lim | H04N 19/426 19/426 |

OTHER PUBLICATIONS

Yamaguchi, et al., "SHD Movie Distribution System Using Image Container with 4096×2160 Pixel Resolution and 36 Bit Color", In Proceedings of IEEE International Symposium on Circuits and Systems, May 23, 2005, pp. 5918-5921.

Shirai, et al., "4K SHD Real-Time Video Streaming System With JPEG 2000 Parallel Codec", In Proceedings of IEEE Asia Pacific Conference on Circuits and Systems, Dec. 4, 2006, pp. 1855-1858.

* cited by examiner

REPRESENTING ADVANCED COLOR IMAGES IN LEGACY CONTAINERS

CLAIM OF PRIORITY UNDER 35 U.S.C. § 119

The present application for patent claims priority to Provisional Application No. 62/505,635, entitled "REPRESENTING ADVANCED COLOR IMAGES IN LEGACY CONTAINERS" filed May 12, 2017, which is assigned to the assignee hereof and hereby expressly incorporated by reference herein for all purposes.

BACKGROUND

Many computing devices are equipped with cameras for digitally capturing images, video, etc. for storing on the computing device or other repositories for subsequent viewing. Cameras are typically capable of capturing high quality raw images, but often down-convert the raw images to 8-bit red, green, blue (RGB) (e.g., in the form of a joint photographic experts group (JPEG) image) for processing by a computing device, and/or display on an associated display compatible for displaying 8-bit JPEG images. In addition, some cameras utilize interfaces that may be limited in throughput, such as various versions of universal serial bus (USB) interfaces. As camera processing capabilities increase, so do technologies for photo capture and display. Additional standards have been proposed for displaying advanced color images, such as high definition images including ultra high definition (UHD), wide color gamut (WCG), high dynamic range 10-bit (HDR10), and high dynamic range 12-bit (HDR12), which can be capable of producing 10-bit to 14-bit images.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for storing advanced color images using legacy containers is provided. The method includes obtaining an advanced color image in a first image format comprising a number of parameters at a first bit depth per pixel, encoding values of the number of parameters of the advanced color image into second values of one or more legacy containers, where each of the one or more legacy containers are of a second image format including the number of parameters at a second bit depth per pixel, and where the first bit depth is greater than the second bit depth. The method also includes storing the advanced color image as the one or more legacy containers.

In another example, a device for storing advanced color images using legacy containers is provided, that includes an image sensor configured to capture a raw image, a memory for storing one or more parameters or instructions for storing the raw image as an advanced color images using one or more legacy containers, and at least one processor coupled to the memory. The at least one processor is configured to obtain the advanced color image in a first image format comprising a number of parameters at a first bit depth per pixel, encode values of the number of parameters of the advanced color image into second values of the one or more legacy containers, where each of the one or more legacy containers are of a second image format including the number of parameters at a second bit depth per pixel, and where the first bit depth is greater than the second bit depth. The at least one processor is also configured to store the advanced color image as the one or more legacy containers.

In another example, a computer-readable medium, including code executable by one or more processors for storing advanced color images using legacy containers, is provided. The code includes code for obtaining an advanced color image in a first image format comprising a number of parameters at a first bit depth per pixel, encoding values of the number of parameters of the advanced color image into second values of one or more legacy containers, where each of the one or more legacy containers are of a second image format including the number of parameters at a second bit depth per pixel, and where the first bit depth is greater than the second bit depth, and storing the advanced color image as the one or more legacy containers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to using legacy containers to represent advanced color images. For example, this can allow legacy devices to communicate image data using the legacy containers, which can mitigate the need to modify communication and/or storage mechanisms for the image data to handle specifications of the advanced color images. In an example, an advanced color image, such as high definition images including ultra high definition (UHD), wide color gamut (WCG), high dynamic range 10-bit (HDR10), and high dynamic range 12-bit (HDR12), etc., can be represented as one or more 8-bit joint photographic experts group (JPEG) images, and accordingly stored and/or communicated over one or more interfaces. In this example, a device capable of receiving the image (e.g., from another device or from memory) can decode the one or more 8-bit JPEG images to produce the advanced color image.

In a specific example, an example format of advanced color image (e.g., P010 format) can use a 10-bit luminance value (Y) and 2 10-bit chroma values (Cb, Cr) to represent a 10-bit image. In this example, the 10 bits for each of the three values can be divided into 8-bit segments for storing in one or more 8-bit JPEG containers. In an example, the 8-bit segments can be stored in a plurality of 8-bit JPEG containers, in multiple portions (e.g., slices) of a wide 8-bit JPEG container, etc. For example, a first 8-bit JPEG container, or the first portion of the wide 8-bit JPEG container, can be used to represent the first 255 possible values of Y, Cb, and Cr, a second 8-bit JPEG container, or the second portion of the wide 8-bit JPEG container, can be used to represent the second 255 possible values of Y, Cb, Cr, and so on, such that four 8-bit JPEG containers, or the four portions of the wide 8-bit JPEG container, can be used to represent 1020 possible values of Y, Cb, Cr, and/or a fifth 8-bit JPEG container (or fifth portion) can be used to represent the additional three possible values for each of Y, Cb, and Cr, if desired. Accordingly, for example, a device storing or communicating the advanced color image can encode a 10-bit advanced color image into four or five 8-bit JPEG containers (per pixel), and can store the container(s) or communicate the container(s) to another device for storing or displaying the 10-bit advanced color image. A device that displays the 10-bit advanced color image can obtain the four or five 8-bit JPEG containers, or the wide JPEG container including the multiple 8-bit portions, for each pixel, and can decode the container(s) to obtain the corresponding 10-bit Y, Cb, and Cr values for displaying the corresponding image.

Figure 1:
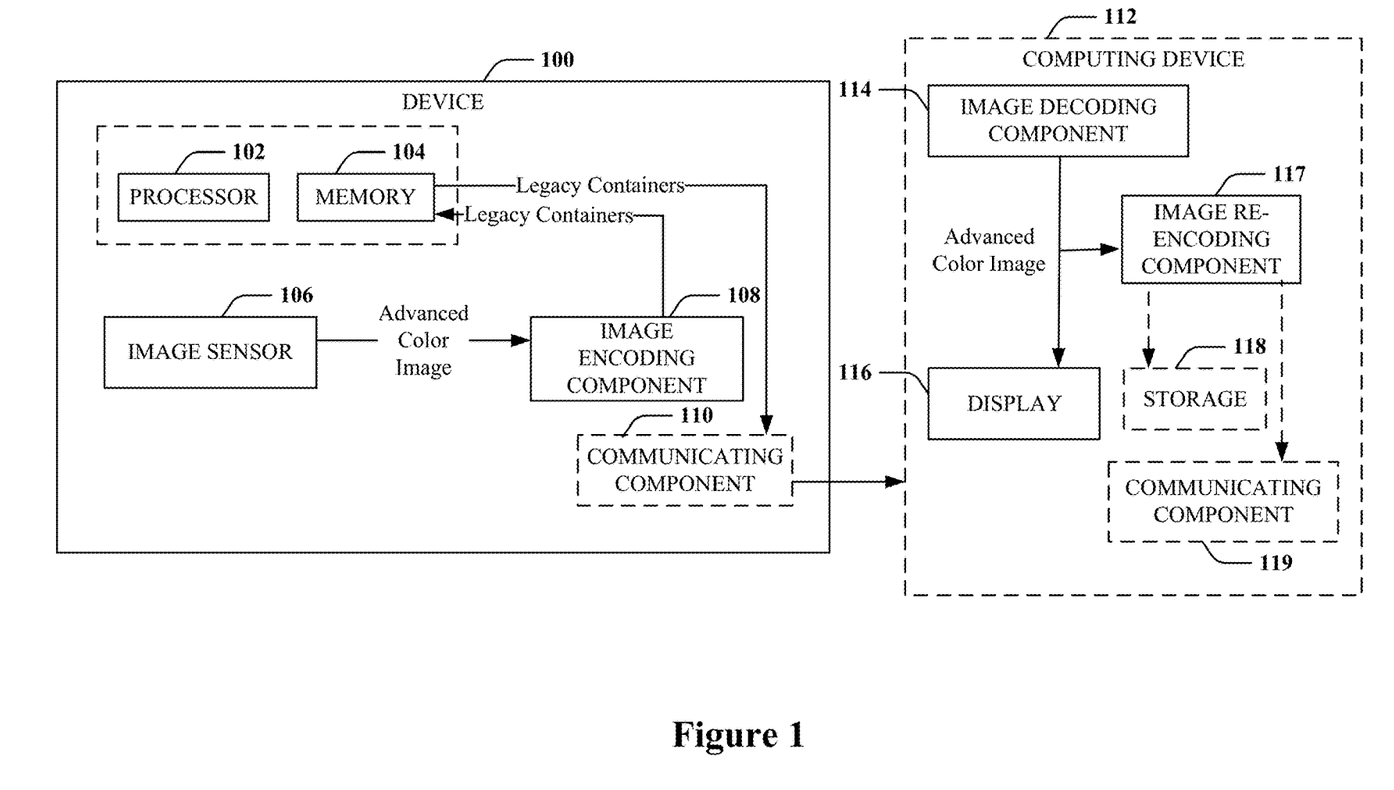
FIG. 1 is a schematic diagram of an example of a device for storing and/or communicating advanced color images using legacy containers.
Figure 2:
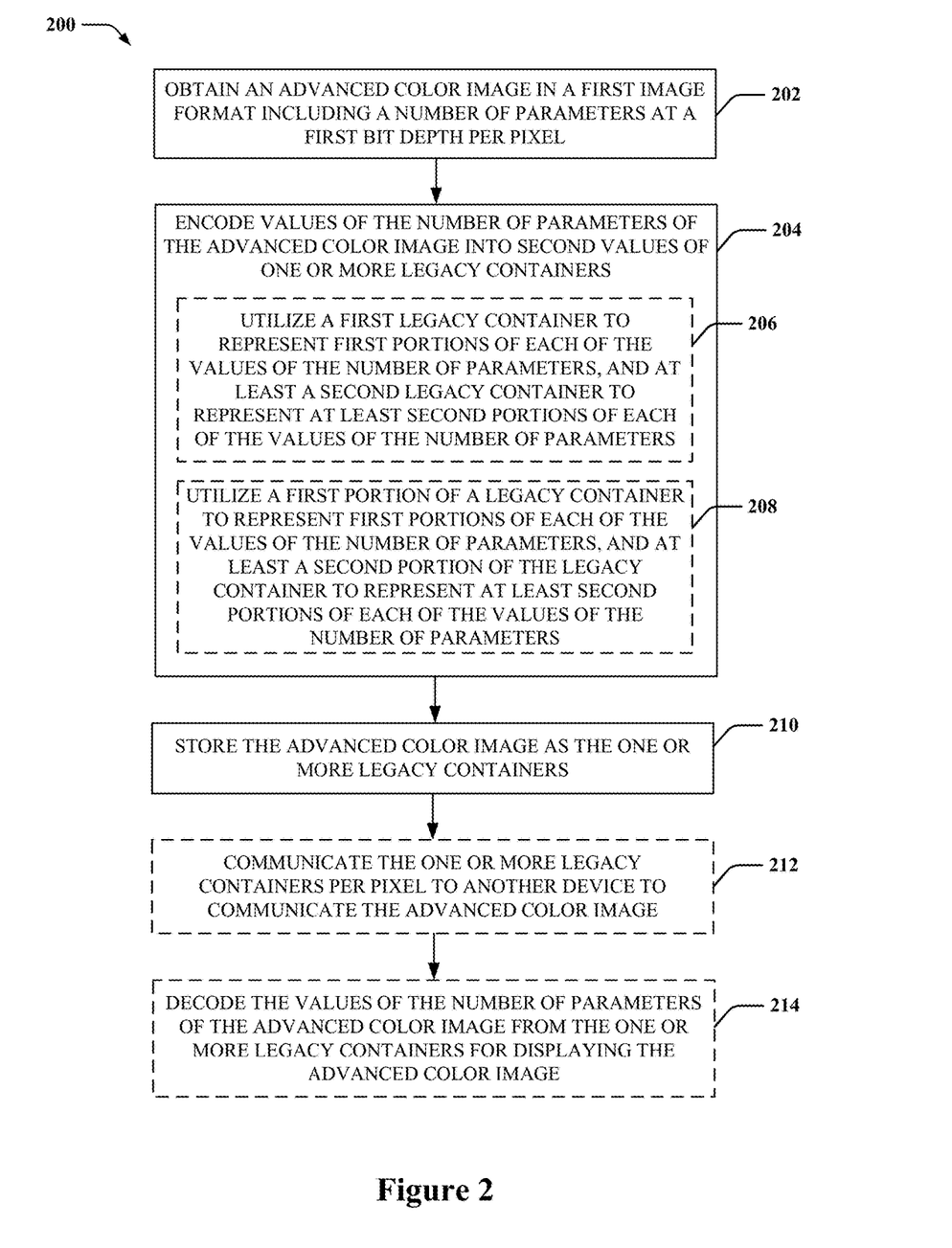
FIG. 2 is a flow diagram of an example of a method for storing and/or communicating advanced color images using legacy containers.
Figure 3:
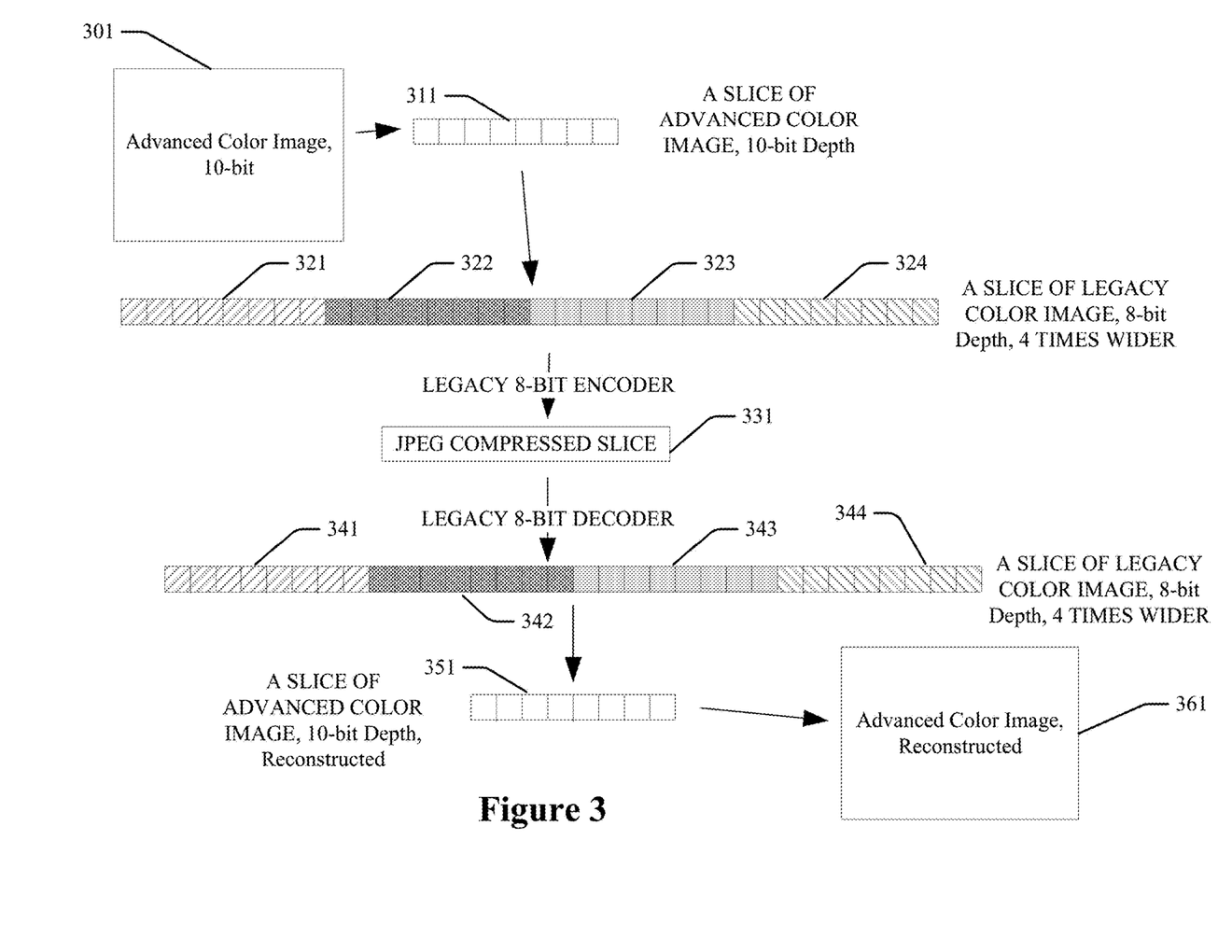
FIG. 3 is a process flow diagram of an example of a device for performing transformation of advanced color image into legacy container, and/or vice versa
Figure 4:
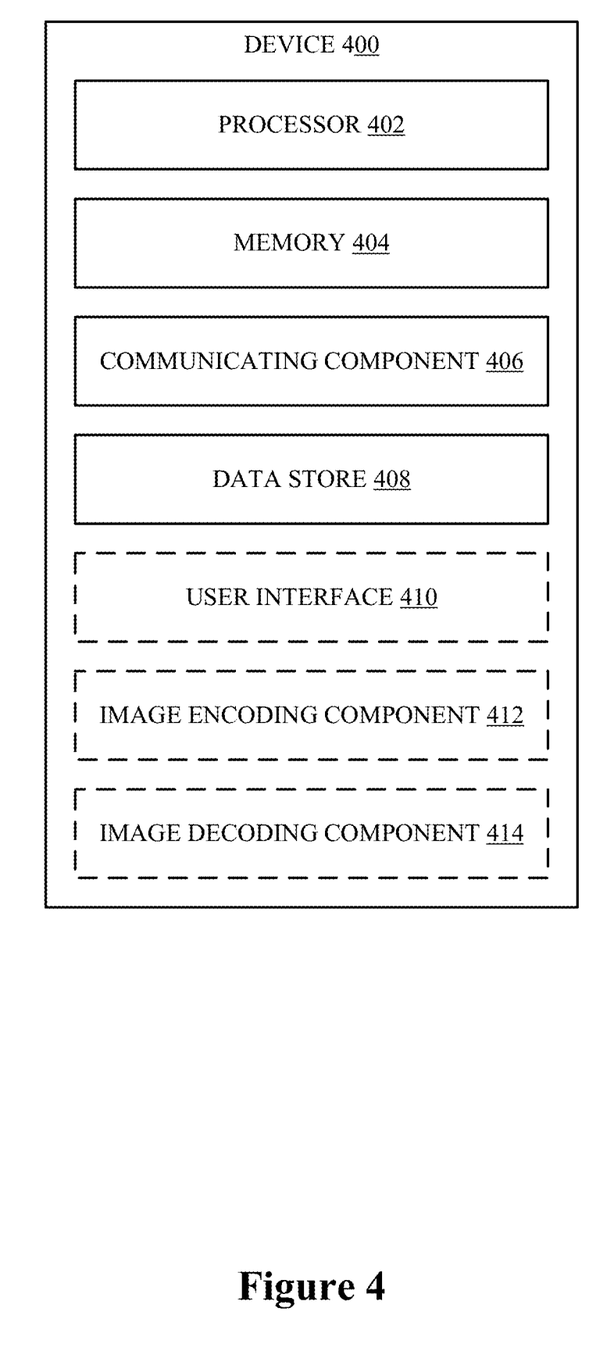
FIG. 4 is a schematic diagram of an example of a device for performing functions described herein.

Turning now to FIGS. 1-4, examples are depicted with reference to one or more components and one or more methods that may perform the actions or operations described herein, where components and/or actions/operations in dashed line may be optional. Although the operations described below in FIGS. 3-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 that can capture advanced color images, and store or communicate the advanced color images using legacy containers. In an example, device 100 can include a processor 102 and/or memory 104 configured to execute or store instructions or other parameters related to operating or providing one of an image sensor 106, an image encoding component 108, a communicating component 110, etc., as described further herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can communicate with a computing device 112 (e.g., via communicating component 110 and/or communicating component 119), which can also include a processor and memory, though not shown.

In an example, the optional computing device 112 may include an image decoding component 114 and a display 116 for displaying advanced color images, such as high definition images including ultra high definition (UHD), wide color gamut (WCG), high dynamic range 10-bit (HDR10), and high dynamic range 12-bit (HDR12), etc. For example, the display 116 may include a liquid crystal display (LCD), plasma display, etc. Moreover, for example, computing device 112 may also include components for more modern compression (encoding) of an image or video, such as an image re-encoding component 117 for re-encoding advanced color images or video to different formats, such as H.265 (also known as High Efficiency Video Codec, HEVC) encoding for video, High Efficiency Image File Format (HEIF), JPEG-extended range (XR) for image compression, etc. Image re-encoding component 117 may store the re-encoded images in storage 118 (e.g., persistent or non-persistent memory on the computing device 112 or remotely located), and/or may communicate the re-encoded images to one or more other devices via communicating component 119, which may be similar to communicating component 110 as described above.

In an example, device 100 can include an image sensor 106 for generating image data in the form of an advanced color image. For example, image sensor 106 may include a camera sensor configured to capture the image and/or a stream of images (e.g., a video), which can be processed as a collection of pixels or other data representative of the advanced color image. In one example, image sensor 106 may be outside of the device 100 and can communicate with the device 100 via an interface. In addition, device 100 and/or image sensor 106 may be part of the computing device 112, in one example. Device 100 can also include an image encoding component 108 for encoding an advanced color image into one or more legacy containers for storing in a memory (e.g., memory 104) and/or providing to one or more other devices (e.g., computing device 112 via communicating component 110). Communicating component 110 and/or communicating component 119 can include substantially any wired or wireless interface for coupling the device 100 to computing device 112, such as universal serial bus (USB), Firewire, local area network (LAN) connection, Bluetooth, near field communications (NFC), wireless LAN (WLAN) connection, etc. In addition, computing device 112 may include an image decoding component 114 for decoding a plurality of legacy containers into an advanced color image for displaying on display 116, and/or for re-encoding via image re-encoding component 117 such as for storing in storage 118 and/or communicating/sharing with other devices via communicating component 119.

FIG. 2 is a flowchart of an example of a method 200 for encoding an advanced color image into one or more legacy containers. For example, method 200 can at least partially be performed by a device 100, 112 and/or one or more components (e.g., an image encoding component 108, processor 102, image decoding component 114, etc.) thereof to facilitate encoding the advanced color images.

In method 200, at action 202, an advanced color image can be obtained in a first format including a number of parameters at a first depth per pixel. In an example, image encoding component 108, e.g., in conjunction with processor 102, memory 104, image sensor 106, etc., can obtain the advanced color image in the first image format including a number of parameters at a first bit depth per pixel. For example, image sensor 106 may capture the image as a raw data image, which can be represented as an advanced color image in a corresponding format. One example of the first image format can include P010, Y210, etc., which can support color spaces including BT.2020 and ST.2084 by including three parameters for each pixel—a luminance value (Y) and two chroma values (Cb, Cr). Each parameter value can be 10 bits to represent a 10-bit advanced color image, 12 bits to represent a 12-bit advanced color image, etc. In any case, image encoding component 108 can obtain the advanced color image as captured by the image sensor 106, from another component, from memory 104, etc.

In addition, for example, image sensor 106 may need not capture the entire image at action 202, but may capture a number of scan lines to facilitate encoding and/or storing/communicating a portion of the image, as described below. For example, JPEG may only require 8 scan lines worth of data before communication can occur. Thus, the device 100 need not have a full frame worth of memory; rather, image sensor 106 may capture only a few scan lines, which can be stored in memory 104, before subsequent steps of the method begin for encoding at least the captured scan lines. In this regard as well, the encoded portion of the image (e.g., a portion of the scan lines of the entire image) can be stored and/or communicated at a time.

In method 200, at action 204, values of the number of parameters of the advanced color image can be encoded into second values of one or more legacy containers. In an example, image encoding component 108, e.g., in conjunction with processor 102, memory 104, etc., can encode the values of the number of parameters of the advanced color image into the second values of the one or more legacy containers. For example, using the one or more legacy containers in this regard can include storing and/or communicating image data using mechanisms defined for the legacy containers, which can decrease complexity in storing/communicating image data of the advanced color image. Moreover, in a specific example, one or more 8-bit JPEG containers can be used, which can allow for backward-compatibility with existing storage/communicating mechanisms for image sensors 106 that include USB cameras. In one example, the legacy container(s) can store the same number of parameters as in the first image format, which can simplify storing of the advanced color image using the one or more legacy containers, as described further herein.

In an example, encoding the values at action 204 may optionally include, at action 206, utilizing a first legacy container to represent first portions of each of the values of the number of parameters, and at least a second legacy container to represent at least second portions of each of the values of the number of parameters. In an example, image encoding component 108, e.g., in conjunction with processor 102, memory 104, etc., can utilize the first legacy container to represent first portions of each of the values of the number of parameters, and at least a second legacy container to represent at least second portions of each of the values of the number of parameters. For example, image encoding component 108 can utilize the values of the legacy containers to represent sets of possible values for the parameters of the advanced color image. As described, for example, the legacy containers can store values at a second bit depth that is less than the bit depth of the advanced color image.

In a specific example, a 10-bit advanced color image can be represented using three 10-bit parameters—one for luminance (Y) and the two chroma values (Cb, Cr). Thus, each parameter can have a value between 0 and 1023 (e.g., $2^{10}$ possible values). In this example, image encoding component 108 can encode each parameter value using the plurality of legacy containers. For example, 8-bit JPEG containers store three 8-bit values—one for red color (R), one for green color (G), and one for blue color (B). Each parameter in the 8-bit JPEG container can have a value between 0 and 255 (e.g., $2^{8}$ possible values). In an example, image encoding component 108 can utilize multiple 8-bit JPEG containers to represent values for the Y, Cb, Cr parameters of an advanced color image. For example, each of the plurality of 8-bit JPEG containers can represent 255 possible values for Y, Cb, and Cr, where the individual R, G, and B values of a given 8-bit JPEG container represent a portion of 255 values for Y, Cb, and Cr, respectively or in any combination.

In this example, using four 8-bit JPEG containers can provide for representing values 0 to 1020 (4*255) for each of Y, Cb, and Cr, where a first 8-bit JPEG container is ($Y_1$, $Cb_1$, $Cr_1$), a second 8-bit JPEG container is ($Y_2$, $Cb_2$, $Cr_2$), a third 8-bit JPEG container is ($Y_3$, $Cb_3$, $Cr_3$), and a fourth 8-bit JPEG container is ($Y_4$, $Cb_4$, $Cr_4$). In another example, if desired, a fifth 8-bit JPEG container ($Y_5$, $Cb_5$, $Cr_5$) can be used for representing the additional 3 values for each parameter to achieve the full 10-bit value range. For example, image encoding component 108 can set each value of each 8-bit JPEG container such that adding each parameter value in the JPEG containers represents the corresponding advanced color image parameter. For example, to achieve Y=534, Cb=98, Cr=281, the corresponding set of 8-bit JPEG containers can include the following values: first container=(255, 98, 255), second container=(255, 0, 26), third container=(24, 0, 0), fourth container=(0, 0, 0). If the fifth container is used, it can also be (0, 0, 0) in this example.

In another example, the 10-bit Y values could span values of 64 to 940, e.g., as specified in Rec BT.2010 Table 9 for "Narrow Range", https://www.itu.int/dms_pubrec/itu-r/rec/bt/R-REC-BT.2100-0-201607-I!!PDF-E.pdf, while 10-bit Cb and Cr values could span a range of 64 to 960. These "Narrow Range" 10-bit values could also be supported in the examples provided herein. As one option, the legacy 8-bit JPEG could be configured so that 8-bit Y could be in the range 16-235, 8-bit Cb and Cr could be in the range 16-240. Here, a triplet of Y-nar=450, Cb-nar=688, Cr-nar=267, then corresponding set of 8-bit "Narrow" JPEG containers can include the following values: first container=(235, 240, 219), second container=(183, 240, 16), third container=(16, 192, 16), fourth container=(16, 16, 16), for example.

In both examples presented here, the 10-bit advanced color pixel value is separated into plurality of 8-bit legacy pixel values such that in each container the values are in a range of support values for the container. Additionally, the image representing each container may not have abnormal spatial discontinuities or wrap-arounds, and thus the 8-bit image compression algorithm can be efficient. The decoder operation, as described, can include decoding a plurality of 8-bit legacy containers, and adding the pixel values of them to generate 10-bit or 12-bit advanced color images.

In another example, encoding the values at action 204 may optionally include, at action 206, utilizing a first portion of a legacy container to represent first portions of each of the values of the number of parameters, and at least a second portion of the legacy container to represent at least second portions of each of the values of the number of parameters. In an example, image encoding component 108, e.g., in conjunction with processor 102, memory 104, etc., can utilize the first portion of the legacy container to represent first portions of each of the values of the number of parameters, and at least a second portion of the legacy container to represent at least second portions of each of the values of the number of parameters. For example, image encoding component 108 can utilize the values of a large legacy container, which may include multiple portions or slices for representing a legacy image, to represent sets of possible values for the parameters of the advanced color image. Each slice can be a sub-container of the large legacy container that itself can be a standard legacy container. As described, for example, the portions of the legacy container can store values at a second bit depth that is less than the bit depth of the advanced color image.

In a specific example, the large legacy container may be a wide 8-bit JPEG container that includes a size for multiple 8-bit JPEG containers as sub-containers of the large legacy container (e.g., four or five 8-bit JPEG containers, as shown and described with reference to FIG. 3). Moreover, in an example, image encoding component 108 may encode the values using a large legacy container and one or more additional normal legacy containers (e.g., a wide 8-bit JPEG container having four 8-bit legacy containers, and a separate 8-bit container for the fifth 8-bit JPEG (e.g., values 1021-1023), if desired). In addition, for example, image encoding component 108 may compress the large legacy container, as described further herein. In this example, the large legacy container can include the multiple standard legacy containers as contiguously positioned left to right (or right to left) in the corresponding image such that the image in the large legacy containers is 4 (or 5) times wider, as represented in memory, than the advanced color image. In another example, the large legacy container can include the multiple legacy portions as contiguously positioned top to bottom (or bottom to top) in the corresponding image such that the image in the large legacy containers is 4 (or 5) times taller, as represented in memory, than the advanced color image. In yet another example, the large legacy container can include the multiple legacy portions as positioned in a 2×2 block (e.g., left to right and then top to bottom, or substantially any configuration) in the corresponding image such that the image in the large legacy containers is twice the size (e.g., twice as wide and twice as tall), as represented in memory, than the advanced color image. For example, substantially any configuration of the standard sized legacy containers within the large legacy container can be used in storing the legacy portions to represent the advanced color image.

In method 200, at action 210, the advanced color image can be stored as the one or more legacy containers. In an example, image encoding component 108, e.g., in conjunction with processor 102, memory 104, etc., can store the advanced color image as the one or more legacy containers. For example, image encoding component 108 can store the legacy container(s) for (e.g., per pixel of the advanced color image) in memory 104 for subsequent sending, decoding, displaying, etc.

In method 200, optionally at action 212, the one or more legacy containers per pixel can be communicated to another device to communicate the advanced color image. In an example, communicating component 110, e.g., in conjunction with processor 102, memory 104, etc., can communicate the one or more legacy containers per pixel to another device to communicate the advanced color image. For example, another device can include the computing device 112, to which device 100 can be coupled via one or more interfaces and/or within the same housing. Communicating component 110 can communicate the plurality of legacy containers to the computing device 112 via substantially any wired or wireless interface (e.g., USB, Firewire, Bluetooth, etc., as described above). In this regard, current mechanisms for communicating one or more JPEG containers can be used to convey the pixels of the advanced color image. Additionally, current JPEG compression mechanisms can be used to multiplex and/or otherwise compress multiple JPEG containers, and/or multiple portions of a wide JPEG container, for communicating between devices 100, 112. This can also allow for using multiple different versions of USB interface between the image sensor 106 and device 100, or computing device 112, to communicate the legacy 8-bit JPEG container(s) using current specifications, latency, etc. In any case, the computing device 112 may accordingly obtain, decompress, decode, etc., the legacy containers per pixel, as described in further detail below, to display or otherwise process the advanced color image in the advanced color image format (e.g., P010, Y210, etc.).

In method 200, optionally at action 214, the values of the number of parameters of the advanced color image can be decoded from the one or more legacy containers for displaying the advanced color image. In an example, image decoding component 114, e.g., in conjunction with processor 102, memory 104, etc., can decode the values of the number of parameters of the advanced color image from the one or more legacy containers for displaying the advanced color image. For example, image decoding component 114 can add the values of the parameters in the one or more legacy containers (e.g., in the plurality of legacy containers or the plurality of legacy container portions of a large legacy container) corresponding to a given pixel to obtain the values of the corresponding advanced color image parameters. For example, given the one or more legacy 8-bit JPEG containers in the example above: first container or portion=(255, 98, 255), second container or portion=(255, 0, 26), third container or portion=(24, 0, 0), fourth container or portion=(0, 0, 0), potentially with JPEG quantization noise, image decoding component 114 can add the first values of the containers or portions to obtain Y=534, the second values of the containers or portions to obtain Cb=98, and the third values of the containers or portions to obtain Cr=281. Computing device 112 can accordingly display the advanced color image on display 116 once one or more of the pixels are decoded from their respective legacy containers, and/or can otherwise process the advanced color image, store the advanced color image in its advanced color format in memory, compress the advanced color image using a high efficiency compression encoder (e.g., JPEG-extended range (JPEG-XR), high efficiency video coding (HEVC) (H.265), etc. for advanced color images (or video)), etc., as described. In addition, in an example, image decoding component 114 may decompress a large legacy container, as described further herein, to obtain legacy container portions of the large legacy container (e.g., as sub-containers thereof) for decoding the advanced color image values.

Additionally, for example, similar computation could be done on "Narrow Range" legacy 8-bit pixel values to generate "Narrow Range" 10-bit Advanced Color pixel values. For example, "Narrow Range" 8-bit values can be used in digital television where luminance (Y) values within a range of 16-235 are considered nominal range, and other values (e.g., 0-15 and 236-255 for 8-bit) can be considered as headroom for filtering operations. In the "Narrow Range"

example, the plurality of 8-bit JPEG containers have: first container or portion=(235, 240, 219), second container or portion=(183, 240, 16), third container or portion=(16, 192, 16), fourth container or portion=(16, 16, 16), potentially with quantization noise. In this example, the image decoding component 114 can add the first values of the containers to obtain Y-nar=450, add the second values of the containers to obtain Cb-nar=688, and the third values of the containers to obtain Cr-nar=267 in the 10-bit "Narrow Range" 10-bit Advanced Color representation.

Since legacy 8-bit JPEG container can support different color subsampling schemes, including 4:2:0, 4:2:2, and 4:4:4, similar 10-bit Advanced Color subsampling can be supported using the split-merge concept described above to encode the advanced color image values into the legacy container(s) and/or subsequently decode the advanced color image values from the legacy container(s).

Several variations of splitting a 10-bit (or 12-bit) container into the multitude of 8-bit containers or portions of a wide 8-bit container may be possible as well. In one example, the image encoding component 108 may encode the image into multiple containers where a first container may have the most variability (or most signal energy) of the multiple containers, while a second container may have next higher variability, and so on. Such a splitting scheme may result in improved compressibility of legacy 8-bit containers (e.g., based on modeling bit rate versus distortion for a given signal energy), as the first container may have a majority of the values representing the image, the second container may have the next most of the values representing the image, etc.

FIG. 3 illustrates an example of a process of leveraging a legacy 8-bit JPEG encoder to compress 10-bit advanced color image, and leveraging a legacy 8-bit JPEG decoder to decompress the 10-bit advanced color image (e.g., by an image encoding component 108 and/or image decoding component 114, as described above). In this example, an Advanced Color Image 301 is conceptually broken into multiple horizontal slices 311, each slice being 8 lines worth of 10-bit deep Y, Cb, Cr data. This slice is transformed into four 8-bit legacy containers, 321, 322, 323, 324, as described earlier. The four 8-bit legacy "slices" are concatenated to a wide slice of 8-bit data (e.g., a large legacy container), which may be fed into a single legacy 8-bit encoder such as a JPEG. The JPEG encoder produces a standard compressed JPEG image 331 that is 4-times wider than the slice 311 of the original advanced color image 301. For example, the compressed JPEG image 331 may be stored (e.g., by an image encoding component 108 in memory 104, etc.) and/or communicated (e.g., by communicating component 110) to one or more devices, such as computing device 112. On the receiver side, for example, a legacy JPEG decoder produces a decoded 8-bit legacy slice that is 4-times wider than the slide 311 original advanced color image, with decoded slices 341, 342, 343, 344. These 4 slices (legacy containers) can be added back (e.g., based on the earlier description) to produce a reconstructed a slice of 10-bit advanced color image 351. Multiple such reconstructed slices can form a complete reconstructed 10-bit image 361.

FIG. 4 illustrates an example of device 400 including additional optional component details as those shown in FIG. 1. In one aspect, device 400 may include processor 402, which may be similar to processor 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 104 such as for storing local versions of operating systems (or components thereof) and/or applications being executed by processor 402, such as image encoding component 412, image decoding component 414, etc., related instructions, parameters, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communicating component 406 that provides for establishing and maintaining communications with one or more other devices, parties, entities, etc. utilizing hardware, software, and services as described herein. Communicating component 406 may be similar to communicating component 110, and may carry communications between components on device 400, as well as between device 400 and external devices, such as devices located across a communications network and/or devices serially or locally connected to device 400. For example, communicating component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc., not currently being executed by processor 402. In addition, data store 408 may be a data repository for image encoding component 412, image decoding component 414 and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Device 400 may optionally additionally include an image encoding component 412, which may be similar to image encoding component 108, for encoding an advanced color image into a plurality of legacy containers for storing in memory 404, communicating via communicating component 406, etc., and/or an image decoding component 414, which may be similar to image decoding component 114 for decoding a plurality of legacy containers into an advanced color image (e.g., where each pixel of the advanced color image may be represented using a plurality of legacy containers), as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for storing advanced color images using legacy containers, comprising:
   obtaining an advanced color image in a first image format comprising a number of parameters at a first bit depth per pixel;
   encoding, for each given pixel in the advanced color image, values of the number of parameters of the given pixel into second values of multiple legacy containers, wherein each of the multiple legacy containers are of a second image format comprising the number of parameters at a second bit depth per pixel, wherein the first bit depth is greater than the second bit depth, and wherein encoding the values of the number of parameters comprises at least:
      utilizing a first legacy container of the multiple legacy containers to represent a first range of values of each of the values of the number of parameters, and
      utilizing at least a second legacy container of the multiple legacy containers to represent one or more next ranges of values of each of the values of the number of parameters; and
   storing the advanced color image as the multiple legacy containers.

2. The method of claim 1, wherein the first bit depth is 10 bits and the second bit depth is 8 bits, and wherein encoding the values of the number of parameters further comprises utilizing a third legacy container of the multiple legacy containers to represent a third range of values of each of the values of the number of parameters, and a fourth legacy container of the multiple legacy containers to represent a fourth range of values of each of the values of the number of parameters.

3. The method of claim 2, wherein the multiple legacy containers are sub-containers of a large legacy container.

4. The method of claim 3, wherein the multiple legacy containers are 8-bit joint photographic experts group (JPEG) sub-containers of the large legacy container.

5. The method of claim 4, further comprising compressing the 8-bit JPEG sub-containers for communicating to another device.

6. The method of claim 4, further comprising compressing the 8-bit JPEG sub-containers into a single 8-bit JPEG container for communicating to another device.

7. The method of claim 1, wherein obtaining the advanced color image comprises obtaining raw image data from a camera.

8. The method of claim 1, further comprising:
   obtaining the multiple legacy containers representing the advanced color image;
   determining values of the number of parameters per pixel based at least in part on corresponding values in the multiple legacy containers associated with the pixel; and
   displaying the advanced color image based on the determined values.

9. The method of claim 8, wherein determining the values of the number of parameters per pixel comprises, for each parameter of the number of parameters, adding the corresponding values in the multiple legacy containers.

10. A device for storing advanced color images using legacy containers, comprising:
    an image sensor configured to capture a raw image;
    a memory for storing one or more parameters or instructions for storing the raw image as an advanced color image using multiple legacy containers; and
    at least one processor coupled to the memory, wherein the at least one processor is configured to:
       obtain the advanced color image in a first image format comprising a number of parameters at a first bit depth per pixel;
       encode, for each given pixel in the advanced color image, values of the number of parameters of the given pixel into second values of the multiple legacy containers, wherein each of the multiple legacy containers are of a second image format comprising the number of parameters at a second bit depth per pixel, wherein the first bit depth is greater than the second bit depth, wherein the at least one processor is configured to encode the values of the number of parameters at least in part by:
  utilizing a first legacy container of the multiple legacy containers to represent a first range of values of each of the values of the number of parameters, and
  utilizing at least a second legacy container of the multiple legacy containers to represent one or more next ranges of values of each of the values of the number of parameters; and
store the advanced color image as the multiple legacy containers.

11. The device of claim 10, wherein the first bit depth is 10 bits and the second bit depth is 8 bits, and wherein the at least one processor is further configured to:
  encode a third legacy container of the multiple legacy containers to represent a third range of values of each of the values of the number of parameters, and
  encode a fourth legacy container of the multiple legacy containers to represent a fourth range of values of each of the values of the number of parameters.

12. The device of claim 11, wherein the multiple legacy containers are sub-containers of a large legacy container.

13. The device of claim 12, wherein the multiple legacy containers are 8-bit joint photographic experts group (JPEG) sub-containers of the large legacy container.

14. The device of claim 13, wherein the at least one processor is further configured to compress the 8-bit JPEG sub-containers for communicating to another device.

15. The device of claim 13, wherein the at least one processor is further configured to compress the 8-bit JPEG sub-containers into a single 8-bit JPEG container for communicating to another device.

16. The device of claim 10, wherein the at least one processor is configured to obtain the advanced color image as raw image data from a camera.

17. The device of claim 10, wherein the at least one processor is further configured to:
  obtain the multiple legacy containers representing the advanced color image;
  determine values of the number of parameters per pixel based at least in part on corresponding values in the multiple legacy containers associated with the pixel; and
  display the advanced color image based on the determined values.

18. The device of claim 17, wherein the at least one processor is configured to determine the values of the number of parameters per pixel at least in part by, for each parameter of the number of parameters, adding the corresponding values in the multiple legacy containers.

19. A non-transitory computer-readable medium, comprising code executable by one or more processors for storing advanced color images using legacy containers, the code comprising code for:
  obtaining an advanced color image in a first image format comprising a number of parameters at a first bit depth per pixel;
  encoding, for each given pixel in the advanced color image, values of the number of parameters of the given pixel into second values of multiple legacy containers, wherein each of the multiple legacy containers are of a second image format comprising the number of parameters at a second bit depth per pixel, wherein the first bit depth is greater than the second bit depth, wherein the code for encoding encodes the values of the number of parameters at least in part by:
    utilizing a first legacy container of the multiple legacy containers to represent a first range of values of each of the values of the number of parameters, and
    utilizing at least a second legacy container of the multiple legacy containers to represent one or more next ranges of values of each of the values of the number of parameters; and;
  storing the advanced color image as the multiple legacy containers.

20. The non-transitory computer-readable medium of claim 19, wherein the first bit depth is 10 bits and the second bit depth is 8 bits, and wherein the code further comprises code for:
  encoding a third legacy container of the multiple legacy containers to represent a third range values of each of the values of the number of parameters, and
  encoding a fourth legacy container of the multiple legacy containers to represent a fourth range of values of each of the values of the number of parameters.

* * * * *